US012802248B2

(12) United States Patent
Ucar et al.

(10) Patent No.: US 12,802,248 B2
(45) Date of Patent: Nov. 17, 2026

(54) SYSTEMS AND METHODS FOR IMPROVING DISTANCE PREDICTIONS

(71) Applicant: Toyota Motor Engineering & Manufacturing North America, Inc., Plano, TX (US)

(72) Inventors: Seyhan Ucar, Mountain View, CA (US); Xiaofei Cao, Mountain View, CA (US); Emrah Akin Sisbot, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 273 days.

(21) Appl. No.: 18/495,145

(22) Filed: Oct. 26, 2023

(65) Prior Publication Data

US 2025/0139796 A1 May 1, 2025

(51) Int. Cl.
*G06T 7/50* (2017.01)
*G06T 7/73* (2017.01)
*G06V 20/58* (2022.01)

(52) U.S. Cl.
CPC .................. *G06T 7/50* (2017.01); *G06T 7/73* (2017.01); *G06V 20/58* (2022.01); *G06T 2207/20081* (2013.01); *G06T 2207/30261* (2013.01)

(58) Field of Classification Search
CPC ..... G06T 2207/10028; G06T 7/50–586; G06T 7/70; G06T 2207/10016;
(Continued)

(56) References Cited

U.S. PATENT DOCUMENTS 8,330,818 B2 12/2012 Cheng et al.
9,558,584 B1 1/2017 Lo et al.
(Continued)

FOREIGN PATENT DOCUMENTS

CN 115115687 A * 9/2022 ............... G06T 7/80
CN 114339607 B * 7/2023
(Continued)

OTHER PUBLICATIONS

Chawla, J., Thakurdesai, N., Godase, A., Reza, M., Crandall, D., & Jung, S. H. (Sep. 2021). Error diagnosis of deep monocular depth estimation models. In 2021 IEEE/RSJ International Conference on Intelligent Robots and Systems (IROS) (pp. 5344-5649). IEEE. (Year: 2021).*

(Continued)

*Primary Examiner* — Atiba O Fitzpatrick
*Assistant Examiner* — Emma E Dryden
(74) *Attorney, Agent, or Firm* — Christopher G. Darrow; Darrow Mustafa PC

(57) ABSTRACT

System, methods, and other embodiments described herein relate to improving the protection of a first vehicle using a second vehicle. In one embodiment, a method includes determining a predicted distance to at least one object using an image acquired by a camera of a vehicle, inferring a contextual feature about the image, and in response to determining the contextual feature is associated with a correction factor, correcting the predicted distance using the distance correction factor.

18 Claims, 6 Drawing Sheets

(58) Field of Classification Search

CPC . G06T 2207/30248; G06T 2207/30252; G06T 2207/30236; G06V 20/56; G06V 20/58; G06V 20/582; G06V 20/584; G06V 20/586; G06V 20/588; G06V 20/597; G06V 20/54; G06V 2201/08; G06V 20/10

See application file for complete search history.

(56) References Cited

U.S. PATENT DOCUMENTS

| | | | | |
|---|---|---|---|---|
| 10,713,506 | B2 | 7/2020 | Gupta et al. | |
| 10,762,650 | B1 | 9/2020 | Guo et al. | |
| 11,087,494 | B1 | 8/2021 | Srinivasan | |
| 11,170,299 | B2 | 11/2021 | Kwon et al. | |
| 11,260,827 | B1 * | 3/2022 | Lin | B60R 25/245 |
| 11,287,523 | B2 | 3/2022 | Xing et al. | |
| 11,341,719 | B2 | 5/2022 | Guizilini et al. | |
| 11,682,137 | B2 | 6/2023 | Srinivasan | |
| 2013/0106837 | A1 | 5/2013 | Mukherjee et al. | |
| 2018/0362082 | A1 | 12/2018 | Anderson et al. | |
| 2020/0104612 | A1 | 4/2020 | Chen et al. | |
| 2022/0110511 | A1 * | 4/2022 | Tomatsu | A61B 1/051 |
| 2022/0148206 | A1 | 5/2022 | Guizilini et al. | |
| 2022/0270371 | A1 * | 8/2022 | Derbisz | G06V 10/764 |
| 2023/0099598 | A1 * | 3/2023 | Mehra | B60W 30/09 701/93 |
| 2023/0205216 | A1 | 6/2023 | Beijbom et al. | |
| 2023/0230368 | A1 * | 7/2023 | Shokonji | G06V 10/80 702/152 |
| 2024/0257370 | A1 * | 8/2024 | Koh | G06T 7/70 |
| 2025/0005777 | A1 * | 1/2025 | Ye | G06T 7/593 |

FOREIGN PATENT DOCUMENTS

| | | | | |
|---|---|---|---|---|
| DE | 202006012548 U1 | | 2/2007 | |
| DE | 102013102504 A1 | | 9/2013 | |
| KR | 101874968 B1 | * | 8/2018 | G01B 11/14 |
| WO | 2022151664 A1 | | 9/2013 | |

OTHER PUBLICATIONS

Zhu, J., & Fang, Y. (2019). Learning object-specific distance from a monocular image. In Proceedings of the IEEE/CVF International Conference on computer vision (pp. 3839-3848). (Year: 2019).*

Ding, D. S., & Chu, W. T. (Sep. 2015). Weather-Adaptive Distance Metric for Landmark Image Classification. In Pacific Rim Conference on Multimedia (pp. 139-148). Cham: Springer International Publishing. (Year: 2015).*

Parking Assist System, U.S. Appl. No. 17/957,145, filed Sep. 30, 2022.

Monocular Depth Estimation Parameter Assistance and Augmentation, U.S. Appl. No. 18/161,587.

* cited by examiner

SYSTEMS AND METHODS FOR IMPROVING DISTANCE PREDICTIONS

TECHNICAL FIELD

The subject matter described herein relates, in general, to improving distance predictions to an object in an image and, more particularly, to providing improved distance predictions to an object in an image by inferring contextual features about the image and correcting distance predictions using correction factors corresponding to the contextual features.

BACKGROUND

Vehicle cameras can capture images of a vehicle environment, where the images may include important details, such as obstacles in the vicinity of the vehicle. However, camera images captured by vehicle cameras are two-dimensional (2D), and therefore, do not provide depth/distance information associated with obstacles captured in the images. Accordingly, while vehicle cameras capture critical information that can be useful for vehicle systems, such as a parking assist system or emergency brake system, without depth/distance information, vehicle systems cannot output informed safety notifications and vehicle maneuvers to avoid dangers, such as obstacles, captured by the cameras. One method to estimate distance information from 2D images includes using computer vision and machine learning techniques to estimate distance information using a monocular camera (i.e., monocular depth estimation (MDE)).

The MDE technique involves training a machine learning model to correlate 2D visual features captured by a monocular camera with actual depth values associated with the visual features. The trained model is then used to estimate depth values in future images captured by the monocular camera. However, MDE suffers from drawbacks. Specifically, MDE models tend to over/underestimate depth values in corner cases, where corner cases represent instances where predicted and ground truth distances differ by more than a threshold amount. Corner cases can include situations where various contextual features, such as vehicle maneuvers, vehicle features, weather, etc., are present when images are captured. Accordingly, because current methods of training MDE models do not compensate for corner cases, MDE depth values may be over/underestimated during critical situations. Over/underestimated depth values may cause vehicle systems to output early, late, or no proper warning notifications when a driver is operating a vehicle. Improper warnings can result in undesirable road incidents, such as collisions, frustrated drivers, vehicle damage, etc.

SUMMARY

In one embodiment, a system is disclosed. The system includes one or more processors and a memory communicably coupled to the one or more processors. The memory stores instructions that, when executed by the one or more processors, cause the one or more processors to determine a predicted distance to at least one object using an image acquired by a camera of a vehicle, infer a contextual feature about the image, and responsive to determining the contextual feature is associated with a correction factor, and correct the predicted distance using the distance correction factor.

In another embodiment, a non-transitory computer-readable medium includes instructions that, when executed by one or more processors, cause the one or more processors to determine a predicted distance to at least one object using an image acquired by a camera of a vehicle, infer a contextual feature about the image, and responsive to determining the contextual feature is associated with a correction factor, and correct the predicted distance using the distance correction factor.

In yet another embodiment, a method is disclosed that includes determining a predicted distance to at least one object using an image acquired by a camera of a vehicle, inferring a contextual feature about the image, and in response to determining the contextual feature is associated with a correction factor, and correcting the predicted distance using the distance correction factor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
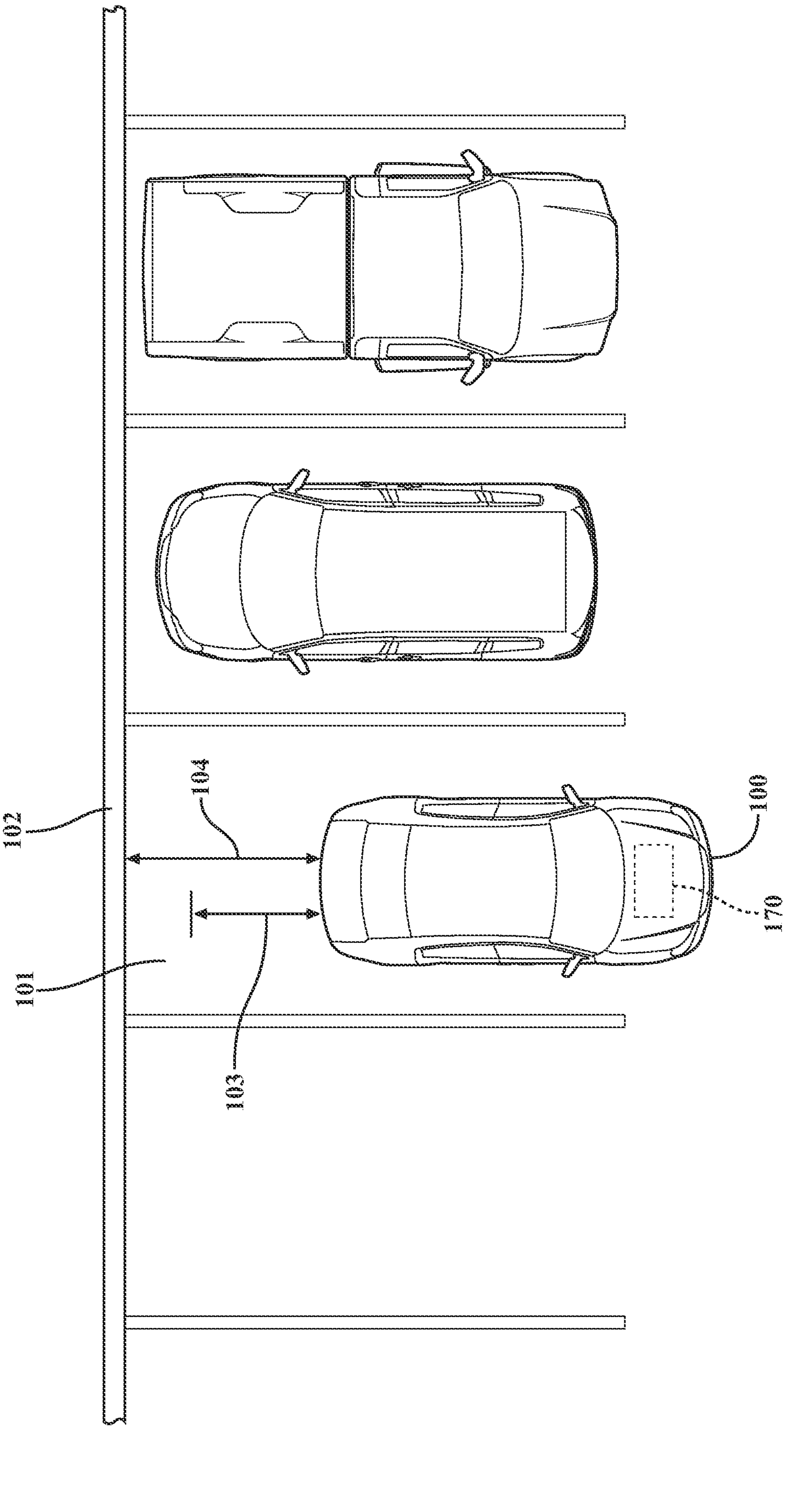
FIG. 1 shows an illustrative example of a vehicle that can utilize distance prediction correction techniques.

Systems, methods, and other embodiments associated with improving distance predictions to an object in an image are disclosed herein. As previously discussed, vehicle cameras capture two-dimensional (2D) images that do not provide depth/distance information necessary for vehicle systems to output critical notifications and execute safe driving maneuvers. Further, current methods for providing depth values associated with visual features, such as monocular depth estimation (MDE), do not properly estimate depth in various situations (e.g., in the presence of different weather conditions, vehicle maneuvers, etc.), which can result in vehicle systems outputting inaccurate safety notifications and unsafe road incidents.

Therefore, in one embodiment, a system that improves predicting distances to 2D visual features in an image is disclosed. In one aspect, the system is implemented in a vehicle that includes one or more cameras for capturing 2D images of the vehicle environment. The 2D images may include, for example, an image of an object in the environment. The system determines a predicted distance to the object by, for example, using a monocular object detection machine learning model trained to identify depth values associated with visual features in an image. Specifically, the monocular object detection machine learning model can infer contextual features associated with the image and use the contextual features to output a predicted distance to the object. Contextual features may include internal vehicle properties and external vehicle properties, where internal vehicle properties include dimensions of the vehicle, an operating parameter of the vehicle, and a behavior of a driver of the vehicle, and where external vehicle properties include a classification of the object and a weather condition. For example, the system may infer contextual features, such as snow on the ground and the vehicle executing a reversing maneuver.

The system uses the inferred contextual features to determine whether the contextual features are associated with a correction factor. The correction factors may be stored on-board the vehicle or may be accessible by the vehicle in a network or microcloud environment. In any case, responsive to determining that the contextual features are associated with a learned correction factor, the system corrects the predicted distance to the object using the correction factor. The correction factor is, for example, an overestimation factor or an underestimation factor, where the overestimation factor is associated with the predicted distance being greater than an actual distance to the and where the underestimation factor is associated with the predicted distance being less than an actual distance to the at least one object. In the case of an overestimation factor, the correction factor is subtracted from the predicted distance to output a more accurate distance prediction. In the case of an underestimation factor, the correction factor is added to the predicted distance to output a more accurate distance prediction.

In one or more embodiments, the image captured by the vehicle camera includes multiple regions, with each region including different contextual features. Accordingly, the system can identify correction factors that correspond to each of the contextual features identified in the individual regions and correct distance predictions for each region as described previously. Additionally, the image captured by the vehicle camera may include multiple objects with each object being associated with contextual features that correlate to different correction factors. As such, the system can identify correction factors that correspond to each object identified in the image and correct distance predictions for each object.

In some variations, inferred contextual features may not correspond to correction factors available to the system. However, the predicted distance to an object output by the object detection model and the actual distance to the object may differ greatly. Accordingly, in one approach, the system identifies corner cases where the predicted distance and actual distance to an object in an image differ by a value great enough to satisfy a predefined threshold. Responsive to determining that the threshold is satisfied, the system uses an adjustment machine learning model to develop a new correction factor associated with the contextual features that do not correspond to any previously developed contextual features. For example, the adjustment machine learning model may learn that any time there is snow on the ground and the vehicle is reversing, the difference between the predicted distance and actual distance to an object is approximately two meters. Accordingly, the adjustment machine learning model outputs a correction value of two meters that corresponds to the contextual features of reversing and snow on the ground. In this way, the system can use the new correction factors when the same contextual features are identified in future images.

In any case, after the distance predictions are updated using the correction factors, the system can output distance predictions to a driver of the vehicle. For example, where the driver is utilizing a parking assist feature of the vehicle, the system outputs the updated distance prediction to the driver when warning the driver about nearby obstacles in the vicinity of the vehicle. The predicted distance may also be output to the driver via notifications, such as by providing a more accurate blind spot monitoring warning to a driver when the driver attempts to change lanes. In this way, the system improves providing predicted distances to objects identified in camera images.

Referring to FIG. 1, an example of a vehicle 100 that can utilize distance prediction techniques is illustrated. As illustrated in FIG. 1, the vehicle 100 is attempting to reverse into a parking space 101 using a parking assist feature of the vehicle 100. The parking assist feature outputs warnings to a driver when the vehicle 100 is within a threshold distance of an obstacle, such as a curb 102. Accordingly, the vehicle 100 includes a rear camera (not shown) that provides a video feed to a driver of the vehicle 100 while the vehicle 100 is reversing. The video feed is, for example, presented on a display, such as a heads-up display, within the vehicle 100. If the vehicle 100 is within the threshold distance to the curb 102, the parking assist feature warns the driver using audio and/or visual warnings.

In one approach, the parking assist feature uses a predicted distance 103 to the curb 102 to determine whether the vehicle 100 is within the threshold distance. The predicted distance 103 is, in one embodiment, determined by processing image data acquired from the rear camera using an object detection machine learning model. However, as shown in FIG. 1, the predicted distance 103 is less than an actual distance 104 to the curb 102, where the actual distance 104 is determined from, for example, other sensors of the vehicle 100 (e.g., ultrasound sensors, radar sensors, light detection and ranging sensors (LiDARs), etc.). As such, the output predicted distance 103 is an underestimation of the actual distance 104, which causes the parking assist feature to prematurely warn the driver of the curb 102.

To compensate for the underestimation, the vehicle 100 utilizes a distance prediction system 170. The distance prediction system 170, in one arrangement, infers contextual features about the environment of the vehicle 100 to determine whether the contextual features correlate to a correction factor. In response to determining the contextual features correspond to a correction factor, the distance prediction system 170 adjusts the predicted distance 103 to correlate to the actual distance 104. To explain additional details about how the distance prediction system 170 operates, discussion will now turn to FIGS. 2-7.

Figure 2:
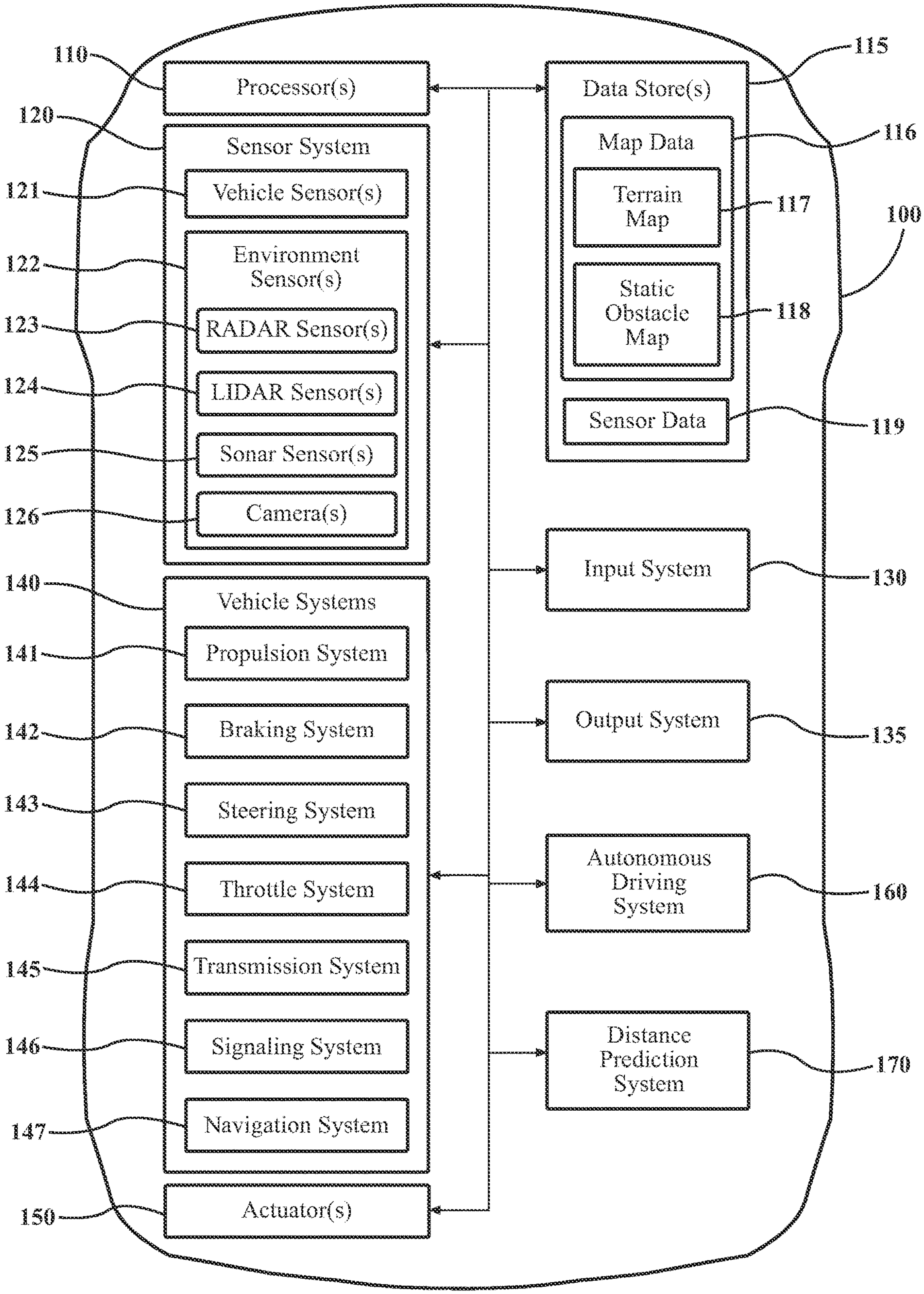
FIG. 2 illustrates one embodiment of a vehicle within which systems and methods disclosed herein may be implemented.

Referring to FIG. 2, a vehicle 100 of FIG. 1 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to identify aspects of the surrounding environment and thus benefits from the functionality discussed herein associated with monitoring the surroundings of the vehicle 100 to identify objects.

The vehicle 100 also includes various elements. It will be understood that in various embodiments, it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment, network, or other system that is remote from the vehicle 100.

Some of the possible elements of the vehicle 100 are shown in FIG. 2 and will be described along with subsequent figures. However, a description of many of the elements in FIG. 2 will be provided after the discussion of FIGS. 3-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a distance prediction system 170 that is implemented to perform methods and other functions as disclosed herein relating to improving distance prediction to at least one object in an image.

As will be discussed in greater detail subsequently, the distance prediction system 170, in various embodiments, is implemented partially within the vehicle 100, and as a network-based service. For example, in one approach, functionality associated with at least one module of the distance prediction system 170 is implemented within the vehicle 100 while further functionality is implemented within a network-based computing system. For example, a vehicle-side instance of the distance prediction system 170 may acquire and report data about predicted and actual distances to objects in an image from cameras and sensors of the vehicle 100, while a network-based instance may analyze and process the data to identify contextual features in the image and develop correction factors associated with the contextual features.

Figure 3:
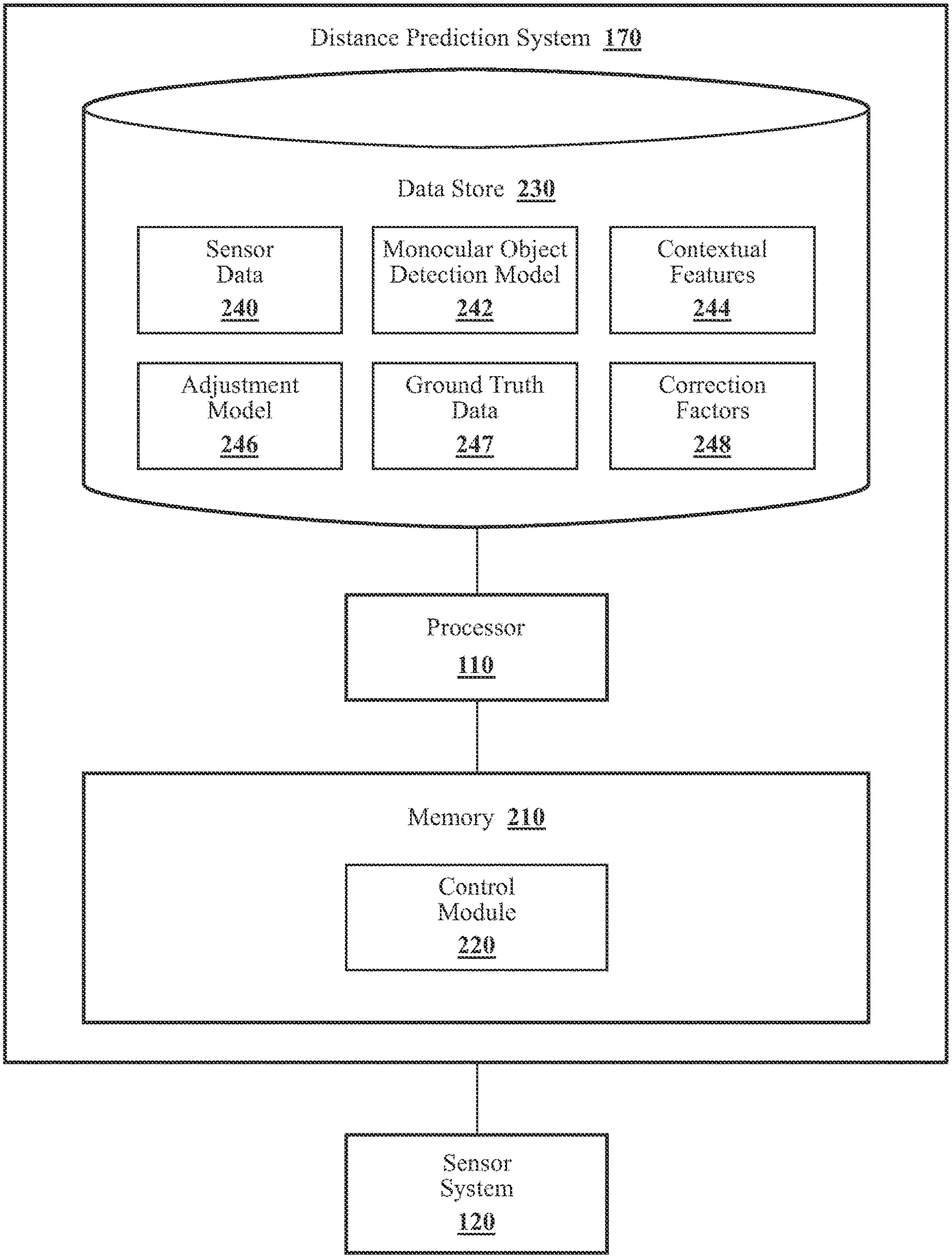
FIG. 3 illustrates one embodiment of a distance prediction system that is associated with improving a distance prediction to an object in an image.

With reference to FIG. 3, one embodiment of the distance prediction system 170 of FIG. 2 is further illustrated. The distance prediction system 170 is shown as including one or more processor(s) 110 from the vehicle 100 of FIG. 2. Accordingly, the processor(s) 110 may be a part of the distance prediction system 170, the distance prediction system 170 may include a separate processor from the processor(s) 110 of the vehicle 100, or the distance prediction system 170 may access the processor(s) 110 through a data bus or another communication path. In one embodiment, the distance prediction system 170 includes a memory 210 that stores a control module 220. The memory 210 is a random-access memory (RAM), read-only memory (ROM), a hard-disk drive, a flash memory, or other suitable memory for storing the control module 220. The control module 220 is, for example, computer-readable instructions that, when executed by the processor(s) 110, cause the processor(s) 110 to perform the various functions disclosed herein.

Figure 4:
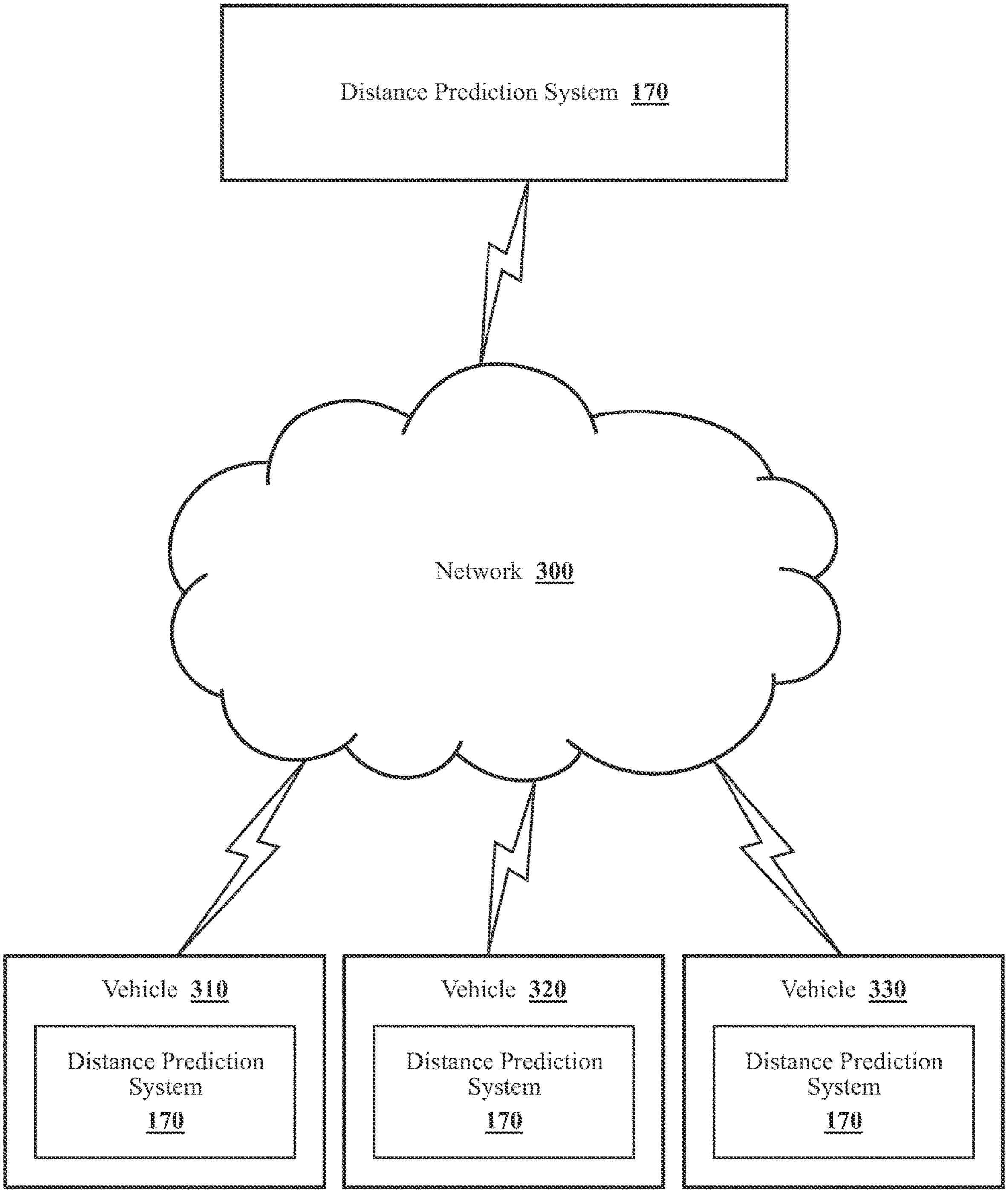
FIG. 4 illustrates one embodiment of the distance prediction system of FIG. 3 in a network environment.

The distance prediction system 170, as illustrated in FIG. 4, is generally an abstracted form of the distance prediction system 170 as may be implemented between the vehicle 100 and a network. FIG. 4 illustrates one example of a network 300 that may be implemented along with the distance prediction system 170. In one approach, the network 300 is a remote server that is accessible by the vehicle 100. As illustrated in FIG. 4, the distance prediction system 170 is embodied at least in part within the network 300 and also within the respective reporting vehicles 310, 320, and 330. That is, the network 300 and vehicles 310, 320, and 330 each include the distance prediction system 170 or at least a portion thereof. Thus, the distance prediction system 170 is generally implemented within both aspects in order to provide for handling of the electronic data that includes the observations.

In one embodiment, network 300 is a vehicular microcloud formed between the vehicles 310, 320, and 330. The microcloud is, for example, a cloud-like network that is formed when the vehicles 310, 320, and 330 are within a threshold distance of one another. The threshold distance can include any distance that allows the vehicles 310, 320, and 330 to communicate locally with one another using wireless communication methods, such as vehicle-to-vehicle (V2V) communications. In this way, vehicles in close proximity to one another can benefit from the distance prediction system 170 performing computationally-intensive tasks, such as processing the sensor data 240 and training machine learning models off-board the vehicles.

Moreover, the vehicles 310, 320, and 330 generally represent reporting vehicles that are equipped with sensors to acquire images and distances associated with objects. That is, the vehicles 310, 320, and 330 are, for example, vehicles similar to the vehicle 100. The noted vehicles may be autonomous, semi-autonomous, equipped with advanced driving assistance systems (ADAS), or another arrangement that generally includes sensors capable of capturing images of objects and distances to the objects within a surrounding environment such that contextual features can be inferred and correction factors can be generated from the sensor data. Additionally, while three vehicles are illustrated, it should be appreciated that, as a general matter the number of vehicles is not limited but instead includes any number of vehicles that are equipped in the noted manner and provide sensor data associated with objects captured in-vehicle camera images.

With continued reference to FIG. 3, the control module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the control module 220, in one embodiment, includes instructions that, when executed by the processor(s) 110, cause the processor(s) 110 to acquire sensor data 240 that includes at least camera images. In further arrangements, the control module acquires the sensor data 240 from further sensors, such as a radar sensor(s) 123, a LiDAR (light detection and ranging) sensor(s) 124, and other sensors as may be suitable for identifying distances to objects in the surroundings of the vehicle 100.

Accordingly, the control module 220, in one embodiment, includes instructions that, when executed by the processor(s) 110, causes the processor(s) 110 to control the respective sensors to provide the data inputs in the form of the sensor data 240. Additionally, while the instructions of the control module 220 are discussed as causing the processor(s) 110 to control the various sensors to provide the sensor data 240, in one or more embodiments, the control module 220 can cause the processor(s) 110 to employ other techniques to acquire the sensor data 240 that are either active or passive. For example, the control module 220 may cause the processor(s) 110 to passively sniff the sensor data 240 from a stream of electronic information provided by the various sensors to further components within the vehicle 100. Moreover, the control module 220 may cause the processor(s) 110 to undertake various approaches to fuse data from multiple sensors when providing the sensor data 240 and/or from sensor data acquired over a wireless communication link. Thus, the sensor data 240, in one embodiment, represents a combination of perceptions acquired from multiple sensors.

Moreover, in one embodiment, the distance prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the control module 220 in executing various functions. In one embodiment, the data store 230 includes the sensor data 240 along with, for example, metadata that characterize various aspects of the sensor data 240. For example, the metadata can include location coordinates (e.g., longitude and latitude), relative map coordinates or tile identifiers, time/date stamps from when the sensor data 240 was generated, and so on.

In one embodiment, the data store 230 further includes a monocular object detection model 242. In one arrangement, the monocular object detection model 242 is a machine learning model that is trained to determine a predicted distance to an object in an image and infer contextual features 244 associated with the image. The monocular object detection model 242 is, in one approach, a deep neural network, such as a transformer model. In any case, the monocular object detection model 242 is trained to infer contextual features 244 using any suitable training method, such as using supervised learning, self-supervised learning, semi-supervised. As such, the monocular object detection model 242 may output both a predicted distance(s) to an object(s) as well as contextual features 244.

The contextual features 244 include internal and external vehicle properties. Internal vehicle properties include, for example, dimensions of the vehicle 100 (e.g., the length, width, and height of the vehicle 100, the distance between the wheel base and cameras of the vehicle 100, etc.), an operating parameter of the vehicle 100 (e.g., whether the vehicle 100 is reversing, whether automatic parking is engaged, etc.), and a behavior of a driver of the vehicle (e.g., whether the driver is continuously controlling the vehicle 100 to move forward and reverse, etc.). External vehicle properties include, for example, a classification of the object (e.g., what type of vehicle the object is, whether the object is a tree/plant, whether the object is a pole, whether the object is a curb, etc.) and a weather condition (e.g., whether the road is wet/snowy, whether there is precipitation in the vicinity of the vehicle 100, whether it is sunny, cloudy, etc.).

In one approach, the monocular object detection model 242 determines the vehicle properties (i.e., the classification of objects) using object detection methods, such as by performing semantic segmentation over the sensor data 240. The weather condition information is, for example, acquired from a weather application programming interface (API), the vehicle sensors 121, wheel speed sensors, etc. In one embodiment, the monocular object detection model 242 determines the dimensions of the vehicle 100 by utilizing a lookup table that is preconfigured by an original equipment manufacturer (OEM) when the vehicle 100 is originally provisioned. Further, the monocular object detection method can identify the behavior of the driver and the operating parameters of the vehicle 100 by utilizing inertial measurement unit (IMU) data (i.e., data associated with the acceleration, speed, orientation, and position of the vehicle 100) and other sensor data 240 (e.g., image data, radar data, LiDAR data, etc.).

The data store 230 additionally includes an adjustment model 246. In one embodiment, the adjustment model 246 is a machine learning model (e.g., a deep neural network, such as a transformer model) trained to adjust the predicted distance output by the monocular object detection model 242 using the predicted distance and the contextual features as inputs. In one approach, the adjustment model 246 is trained using predicted distances output by the monocular object detection model 242, the inferred contextual features 244 associated with the predicted distances, and ground truth data 247 as inputs. Ground truth data 247 includes an actual distance to an object that the monocular object detection model 242 defined a predicted distance for, where the actual distance may be acquired by sensors of the vehicle 100 and/or sensors of nearby vehicles that can identify depth information associated with an object (e.g., radars, LiDARs, ultrasounds, etc.).

As such, the distance prediction system 170 can train the adjustment model 246 using ground truth data that may represent an actual distance to an object that was collected from environment sensor(s) 122 of the sensor system 120. For example, the radar sensor(s) 123, the LIDAR sensor(s) 124, and/or the sonar sensor(s) 125 may be able to detect the distance to an object with much more precision than what is output by the monocular object detection model 242. Because distance calculations based on data collected from these types of sensors are more accurate, this data can be utilized as the ground truth data 247 to train the adjustment model 246. As such, the adjustment model 246 can be trained while the vehicle 100 is operating. This allows significant amounts of data to be collected to train the adjustment model 246. It should also be understood that the adjustment model 246 may be pre-trained and deployed in a vehicle that does not collect ground truth data 247. For example, vehicles that do not include radar sensor(s) 123, LIDAR sensor(s) 124, and/or sonar sensor(s) 125 and rely on images captured by one or more cameras to obtain distances to objects can be equipped with the adjustment model 246 that has already been trained. As such, vehicles that rely substantially or solely on camera vision can still take advantage of the adjustment model 246.

In any case, the adjustment model 246 is trained to identify when the predicted distance differs from the actual distance to an object by more than a threshold amount. The threshold amount can be any predefined distance that would cause potential harm to the vehicle 100, such as one meter, two meters, three meters, etc. When the adjustment model 246 determines the difference between the actual distance and the predicted distance satisfy the threshold amount, the adjustment model 246 correlates the difference with the contextual features 244 present in the image and stores the difference as the correction factor 248. In one approach, the correction factor 248 is an overestimation factor or an underestimation factor. An overestimation correction factor 248 is associated with the predicted distance being greater than an actual distance to an object, and an underestimation factor 248 is associated with the predicted distance being less than an actual distance to an object. Accordingly, overestimation correction factors 248 are subtracted from the predicted distance, and underestimation correction factors 248 are added to the predicted distance. In one arrangement, the correction factors 248 are values that can be multiplied to or divided by the predicted distance. For example, the correction factors 248 may represent scaled values that, when multiplied to or divided by the predicted distance, adjust the predicted distance to reflect an actual distance to an object.

The correction factor 248 is, for example, stored in a lookup table in the data store 230 that is accessible by the processor(s) 110, where the lookup table stores the respective correlations between the contextual features 244 and the correction factors 248. Accordingly, when the same contextual features 244 are present in a future image, the adjustment model 246, in one embodiment, adjusts the predicted distance output by the monocular object detection model 242 using the correction factor 248 that corresponds to the contextual features 244.

Additionally, in one embodiment, the adjustment model 246 is trained to identify when the correction factors 248 are inaccurate/in need of updates. For example, when a difference between an updated predicted distance (i.e., a predicted distance that is updated based on the correction factor 248) and an actual distance to an object differs by a threshold amount (e.g., 1 meter, two meters, three meters, etc.), the adjustment model 246 updates the correction factor 248 by the difference and stores the updated correction factor 248 in the lookup table in the data store 230. In one approach, where the adjustment model 246 is located off-board the vehicle 100 (e.g., in the network 300), the vehicle 100 acquires the updated correction factor 248 via an over-the-air (OTA) update.

The control module 220, in one embodiment, further causes the processor(s) 110 to perform additional tasks beyond controlling the respective sensors to acquire and provide the sensor data 240. In one approach, the control module 220 includes instructions that cause the processor(s) 110 to control the monocular object detection model 242 to process the sensor data 240 to identify the predicted distance to an object in an image. Further, the control module 220 includes instructions that cause the processor(s) 110 to control the monocular object detection model 242 to infer the contextual features 244 about the image. In one embodiment, the image includes a plurality of regions, and each individual region may include different contextual features 244. Accordingly, the control module 220, in one configuration, includes instructions that cause the processor(s) to control the monocular object detection model 242 to infer the contextual features 244 about the individual regions.

In one embodiment, the control module 220 causes the processor(s) 110 to determine whether the contextual features 244 correspond to the correction factors 248. In one approach, the processor(s) 110 determine whether the contextual features 244 correspond to the correction factors 248 using a lookup table that correlates the contextual features 244 with the correction factors 248. Responsive to determining that the contextual features 244 correlate to a correction factor 248, the processor(s) 110 adjust the predicted distance by the correction factor 248 (e.g., by adding, subtracting, multiplying, dividing the correction factor 248). Where the image includes individual regions, the processor(s) 110 apply the correction factor 248 to each individual region depending on the contextual features 244 of the region. For example, if the contextual feature 244 corresponds to an underestimation correction factor, the processor(s) 110 add the value of the correction factor 248 to the predicted distance.

Responsive to determining the contextual feature 244 does not correlate to the any stored correction factors 248, the processor(s) 110, determine a difference between the predicted distance output by the monocular object detection model 242 and an actual distance to the object. As previously discussed, the control module 220 includes instructions that cause the processor(s) 110 to acquire the actual distance using sensors, such as radars, LiDARs, ultrasounds, etc., of the vehicle 100. Accordingly, the processor(s) 110, in one embodiment, controls the adjustment model 246 to determine a new correction factor associated with the contextual feature 244 based, at least in part, on the difference between the predicted distance and actual distance.

In one approach, the processor(s) 110 control the adjustment model 246 to determine a new correction factor in response to determining the difference satisfies a distance threshold that is based, at least in part, on a minimal difference between the predicted distance and the actual distance. The minimal difference is, for example, any value that would cause potential harm to the vehicle 100, such as one meter, two meters, three meters, etc. The minimal difference is defined by, for example, an occupant of the vehicle 100 entering a manual input on a human machine interface (HMI) within the vehicle 100, an original equipment manufacturer (OEM) when the vehicle 100 is originally provisioned, or by any other suitable method. In any case, when the difference satisfies the distance threshold, the processor(s) 110 control the adjustment model 246 to determine a new correction factor. In one arrangement, the control module 220 includes instructions that cause the processor(s) 110 to apply the new correction factor to the predicted distance.

In addition to adjusting the predicted distance, the control module 220, in one configuration, includes instructions that cause the processor(s) 110 to present the predicted distance to a driver of the vehicle 100. For example, where the driver is utilizing a vehicle assistance system, such as the parking assist system, the processor(s) 110 present the updated predicted distance on a display within the vehicle 100 that provides a video feed and visual warnings to the driver. Further, in one embodiment, the processor(s) 110 present the updated predicted distance by providing audible, haptic, and/or visual warnings to the driver when appropriate. As an example, where the updated predicted distance is used in connection with a blind spot monitoring system, the processor(s) 110 may output an audible warning that indicates an object/other vehicle is in the vicinity of the vehicle 100. In this way, the distance prediction system 170 improves driver comfort and vehicle safety by providing accurate distance prediction measurements.

Figure 5:
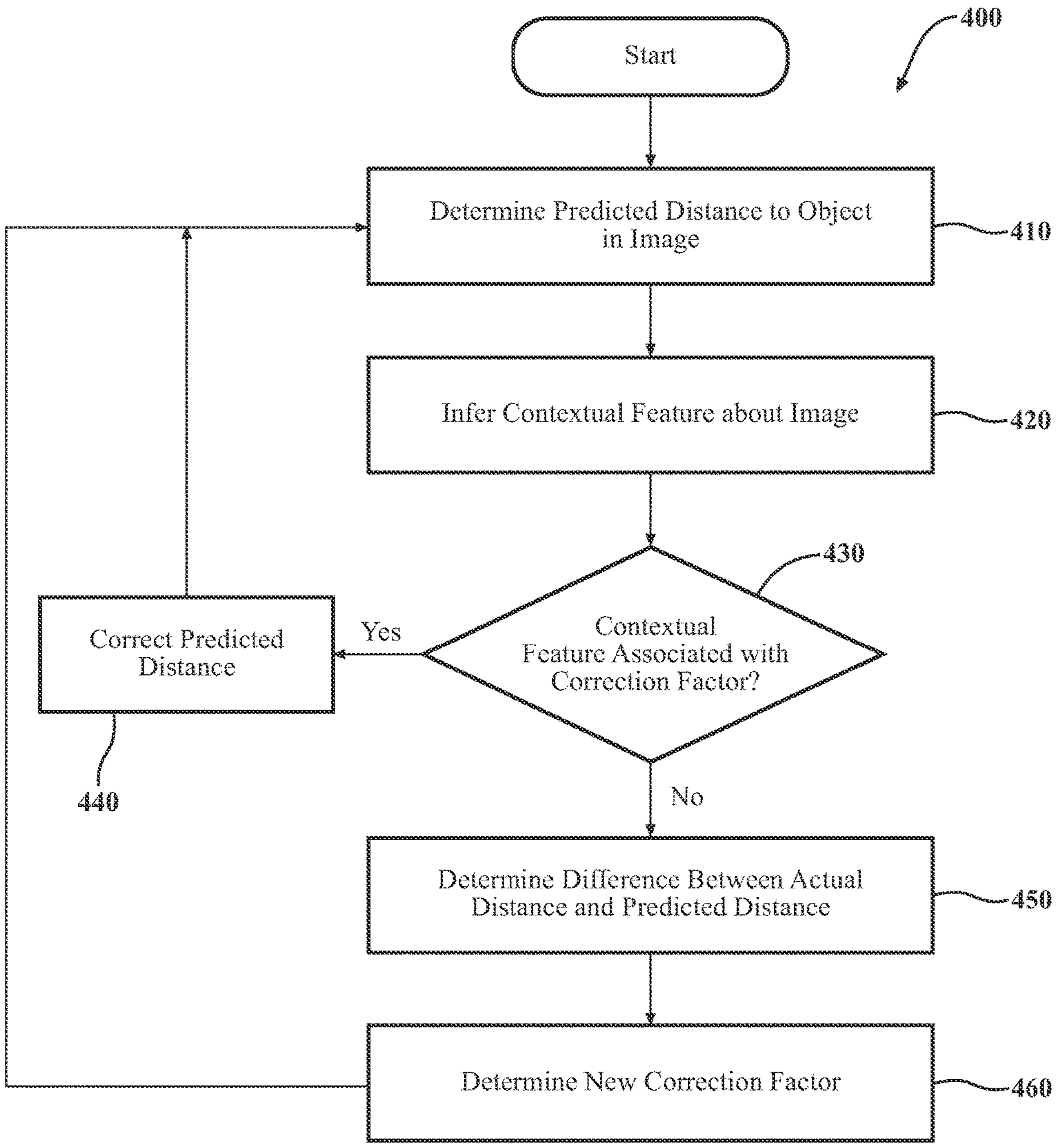
FIG. 5 illustrates one embodiment of a method that is associated with improving a distance prediction to an object in an image.

Additional aspects of protecting a vehicle will be discussed in relation to FIG. 5. FIG. 5 illustrates a flowchart of a method 400 that is associated with predicting a distance to an object captured in an image taken by a vehicle camera. Method 400 will be discussed from the perspective of the distance prediction system 170 of FIGS. 2 and 3. While method 400 is discussed in combination with the distance prediction system 170, it should be appreciated that the method 400 is not limited to being implemented within the distance prediction system 170 but is instead one example of a system that may implement the method 400. Further, while the method 400 and the distance prediction system 170 are discussed as being implemented in the vehicle 100, it should be understood that the distance prediction system 170 may be implemented in a remote network or microcloud accessible by the vehicle 100.

At 410, the control module 220 includes instructions that, when executed by the processor(s) 110, cause the processor (s) 110 to control the sensor system 120 to acquire the sensor data 240. In one embodiment, the control module 220 cause the processor(s) 110 to control the radar sensor(s) 123 and the camera 126 of the vehicle 100 to observe the surrounding environment. Alternatively, or additionally, the control module 220 causes the processor(s) 110 to control the camera 126 and the LIDAR sensor(s) 124 or another set of sensors to acquire the sensor data 240. As part of controlling the sensors to acquire the sensor data 240, it is generally understood that the sensors acquire the sensor data 240 of a region around the vehicle 100 with data acquired from different types of sensors generally overlapping in order to provide for a comprehensive sampling of the surrounding environment at each time step. The sensor data 240 of the region around the vehicle 100 could include data related to objects in the surroundings of the vehicle 100, data related to distances to objects in the surroundings of the vehicle 100, or data related to the vehicle 100 itself. In general, the sensor data 240 need not be of the exact same bounded region in the surrounding environment but should include a sufficient area of overlap such that distinct aspects of the area can be correlated. Thus, the control module 220, in one embodiment, causes the processor(s) 110 to control the sensors to acquire the sensor data 240 of the surrounding environment.

Moreover, in further embodiments, the control module 220 causes the processor(s) 110 to control the sensors to acquire the sensor data 240 at successive iterations or time steps. Furthermore, the control module 220, in one embodiment, causes the processor(s) 110 to execute one or more of the noted functions in parallel for separate observations in order to maintain updated perceptions. Additionally, as previously noted, the control module 220, when acquiring data from multiple sensors, causes the processor(s) 110 to fuse the data together to form the sensor data 240 and to provide for improved determinations of detection, location, and so on.

Additionally, the control module 220, in one arrangement, causes the processor(s) 110 to control the monocular object detection model 242 to process the sensor data 240 to determine the predicted distance to an object in an image. The processor(s) 110 may process the sensor data 240 to determine the predicted distance when the vehicle 100 is utilizing a system that uses distances to objects, as identified by an image, in the vicinity of the vehicle 100 as inputs. For example, the control module 220, in one embodiment, includes instructions that cause the processor(s) 110 to process the sensor data 240 responsive to the vehicle 100 utilizing a parking assist system, backup assist system, trailer hitch assist system, and/or any other assistance system that involves showing a driver of the vehicle 100 a video feed of the surroundings of the vehicle 100 that provides warnings to notify the driver of objects/obstacles in the surroundings. The processor(s) 110 may additionally process the sensor data 240 responsive to determining that the vehicle 100 is using other advanced driver-assistance systems (ADAS) that use distances to nearby objects to provide support to the vehicle 100, such as a parking support brake system (i.e., a system that warns a driver to take evasive action when there is a possibility of collision to nearby objects and that automatically applies brakes to help avoid collision), an advanced parking system (i.e., a system that autonomously parks a vehicle 100), an emergency braking system (i.e., a system that automatically applies the brakes of the vehicle 100 when the vehicle 100 is at risk of colliding with another object), a blind spot monitoring system (i.e., a system that warns a driver of the vehicle 100 when objects/other vehicles are in the blind spot of the vehicle), a lane keeping assist system, etc. In any case, as previously discussed, the monocular object detection model 242 determines the predicted distance to the object in the image according to its trained algorithm.

At 420, the control module 220 includes instructions that cause the processor(s) 110 to control the monocular object detection model 242 to infer the contextual features 244 about the image. In one embodiment, the image includes a plurality of regions, and each individual region may include different contextual features 244. Accordingly, the control module 220, in one configuration, includes instructions that cause the processor(s) to control the monocular object detection model 242 to infer the contextual features 244 about the individual regions.

In one arrangement, the control module 220 causes the processor(s) 110 to acquire the sensor data 240 necessary for the monocular object detection model 242 to determine the internal and external vehicle properties that inform the monocular object detection model 242 of the contextual features 244. For example, in one configuration, the processor(s) 110 acquire the sensor data 240 from an IMU, wheel slip sensors, imaging sensors, radars, LiDARs, ultrasounds, etc. Accordingly, responsive to acquiring the sensor data 240, the monocular object detection model 242 outputs the contextual features 244 present in the image and/or regions of the image. For example, if the IMU data indicates that the vehicle is reversing, and the sensor data 240/weather API indicates snowy weather and snow on the ground, the monocular object detection model 242 determines that the contextual features 244 correspond to a reverse vehicle maneuver and a snowy condition. As another example, if the monocular object detection model 242 utilizes a machine learning technique to classify objects in the image and determines that one region of the image includes a curb and another region of the image includes a pole, the monocular object detection model 242 determines that the contextual feature 244 of the first region includes an object that is classified as a curb and that the second region includes an object that is classified as a pole. Of course, in one or more arrangements, the monocular object detection model 242 may determine other contextual features in addition to vehicle operations, weather conditions, and object classifications, such as vehicle dimensions, a speed of the vehicle, a behavior of the driver, a time of day, etc.

At 430, the control module 220 includes instructions that cause the processor(s) 110 to determine whether the contextual features 244 correspond to the correction factors 248. In one approach, the processor(s) 110 determine whether the contextual features 244 correspond to the correction factors 248 using a lookup table that correlates the contextual features 244 with the correction factors 248. As previously discussed, the correction factors 248 are developed by the adjustment model 246 that is implemented in the distance prediction system 170 of the vehicle 100 and/or that is implemented in the distance prediction system 170 that is part of a network or microcloud. If the contextual features 244 correspond to the correction factors 248, the control module 220 causes the processor(s) 110 to correct the predicted distance as discussed at step 440. Otherwise, the control module 220 causes the processor(s) 110 to determine a new correction factor as discussed at steps 450-460.

At 440, responsive to determining that the contextual features 244 correlate to a correction factor 248, the processor(s) 110 adjust the predicted distance by the correction factor 248 (e.g., by adding, subtracting, multiplying, dividing the correction factor 248). Where the image includes individual regions, the processor(s) 110 apply the correction factor 248 to each individual region depending on the contextual features 244 of the region. If the contextual feature 244 corresponds to an underestimation correction factor, the processor(s) 110 add the value of the correction factor 248 to the predicted distance, and if the contextual feature 244 corresponds to an overestimation correction factor, the processor(s) 110 subtract the value of the correction factor 248 from the predicted distance. As an example, if one region of an image has contextual features 244 corresponding to a curb being present and snow being on the ground, where these contextual features correspond to an overestimation correction factor valued at 1 meter, and a second region of the image has contextual features 244 corresponding to dim lighting, where dim lighting corresponds to an underestimation correction factor valued at 2 meters, the adjustment model 246 adjusts the first region by subtracting 1 meter from the predicted distance and adjusts the second region by adding 2 meters to the predicted distance.

At 450, responsive to determining that the contextual feature 244 does not correlate to the any stored correction factors 248, the control module 220 causes the processor(s) 110 to determine a difference between the predicted distance output by the monocular object detection model 242 and an actual distance (i.e., a ground truth distance value) to the object. As previously discussed, the control module 220 includes instructions that cause the processor(s) 110 to acquire the actual distance using sensors, such as radars, LiDARs, ultrasounds, etc., of the vehicle 100. The control module 220, in one arrangement, controls the processor(s) 110 to determine the difference by comparing the value of the predicted distance to the actual distance.

At 460, the control module 220 causes the processor(s) 110 to control the adjustment model 246 to determine a new correction factor in response to determining the difference satisfies a distance threshold that is based, at least in part, on a minimal difference between the predicted distance and the actual distance. The minimal difference is, for example, any value that would cause potential harm to the vehicle 100, such as one meter, two meters, three meters, etc. The minimal difference is defined by, for example, an occupant of the vehicle 100 entering a manual input on a human machine interface (HMI) within the vehicle 100, an original equipment manufacturer (OEM) when the vehicle 100 is originally provisioned, or any other suitable method. For example, where the distance threshold is two meters, any difference between the predicted distance and actual distance equal to or greater than two meters satisfies the distance threshold.

Figure 6:
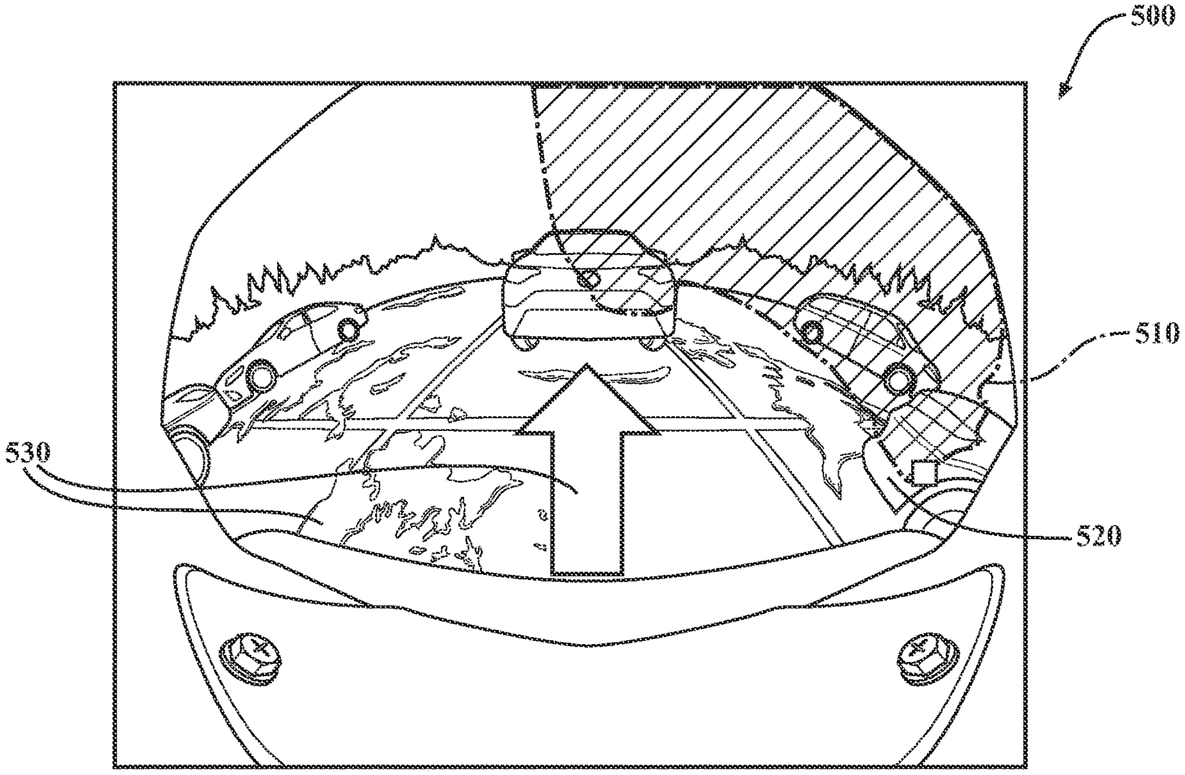
FIG. 6 shows an illustrative example of an image that results in a distance overestimation.
Figure 7:
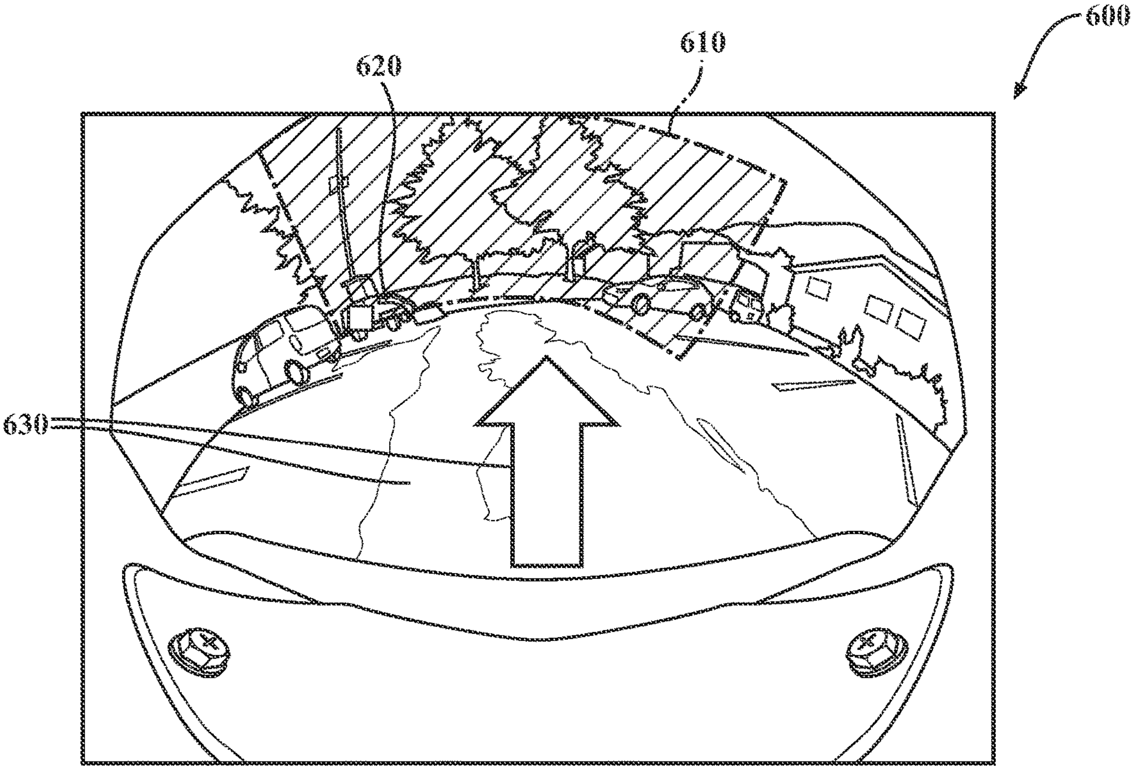
FIG. 7 shows an illustrative example of an image that results in a distance underestimation.

Responsive to determining the difference satisfies the distance threshold, the processor(s) 110 control the adjustment model 246 to determine a new correction factor. As an example, where the contextual features 244 include a vehicle height of four meters from the ground to the wheel base, a speed of six miles per hour, and a sunny weather condition, and where the contextual features 244 do not correlate to any existing correction factors 248, the adjustment model 246 determines whether the difference between the predicted distance and an actual distance to a curb identified in the image satisfies the distance threshold of two meters. If, for example, the predicted distance is 2.01 meters greater than the actual distance, the processor(s) 110 control the adjustment model 246 to determine a new correction factor for these contextual features 244, where the correction factor 248 is an overestimation factor of 2.01 meters. In this way, the distance prediction system 170 provides accurate distance prediction outputs for vehicles and drivers. FIGS. 6-7 will now be discussed to illustrate examples of images that result in distance prediction over and underestimations.

FIGS. 6-7 will be discussed from the perspective of the distance prediction system 170 of FIGS. 2 and 3. Referring to FIG. 6, an image 500 is illustrated. The image 500 is an image that is presented to a driver while the driver is reversing the vehicle 100. As illustrated, a predicted distance 510, where the predicted distance 510 is output by the monocular object detection model 242, to objects 520 in the environment of the vehicle 100 is output to the driver via a displayed warning zone. The monocular object detection model 242 infers contextual features 530 about the image. Here, the monocular object detection model 242 infers that the contextual features 530 include a reverse maneuver of the vehicle 100 and snow on the ground in the environment of the vehicle 100. Further, the adjustment model 246 correlates the inferred contextual features 530 with a correction factor 248. In this case, the correction factor 248 is an overestimation correction factor, meaning that the predicted distance 510 is greater than the actual distance to the objects 520. Accordingly, the control module 220 causes the processor(s) 110 to control the adjustment model 246 to adjust the predicted distance 510 by the overestimation correction factor that correlates to the contextual features 530.

Referring to FIG. 7, an image 600 is illustrated. The image 600 is an image that is presented to a driver while the driver is reversing the vehicle 100. As illustrated, a predicted distance 610, where the predicted distance 610 is output by the monocular object detection model 242, to objects 620 in the environment of the vehicle 100 is output to the driver via a displayed warning zone. The monocular object detection model 242 infers contextual features 630 about the image. Here, monocular object detection model 242 infers that the contextual features 630 include a reverse maneuver of the vehicle 100 and a wet ground in the environment of the vehicle 100. Further, the adjustment model 246 correlates the inferred contextual features 630 with a correction factor 248. In this case, the correction factor 248 is an underestimation correction factor, meaning that the predicted distance 610 is less than the actual distance to the objects 620. Accordingly, the control module 220 causes the processor(s) 110 to control the adjustment model 246 to adjust the predicted distance 610 by the underestimation correction factor that correlates to the contextual features 630. In this way, the distance prediction system 170 improves predicting distances to objects detected in vehicle camera images.

FIG. 2 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is either highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU), and application specific integrated circuit (ASIC), a microprocessor, etc. The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain map(s) 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensor(s) 124 of the sensor system 120.

In some instances, at least a portion of the map data 116 and/or the sensor data 119 can be located in one or more data store(s) 115 located on-board the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more of each of the following: radar sensor(s) 123, LIDAR sensor(s) 124, sonar sensor(s) 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the distance prediction system 170, and/or the autonomous driving system 160 can be operatively connected to communicate with the vehicle systems 140 and/or individual components thereof. For example, returning to FIG. 2, the processor(s) 110 and/or the autonomous driving system 160 can be in communication to send and/or receive information from the vehicle systems 140 to control the movement of the vehicle 100. The processor(s) 110, the distance prediction system 170, and/or the autonomous driving system 160 may control some or all of the vehicle systems 140 and, thus, may be partially or fully autonomous as defined by SAE 0 to 5.

The processor(s) 110, the distance prediction system 170, and/or the autonomous driving system 160 can be operatively connected to communicate with the vehicle systems 140 and/or individual components thereof. For example, returning to FIG. 2, the processor(s) 110, the distance prediction system 170, and/or the autonomous driving system 160 can be in communication to send and/or receive information from the vehicle systems 140 to control the movement, of the vehicle 100. The processor(s) 110, the distance prediction system 170, and/or the autonomous driving system 160 may control some or all of the vehicle systems 140.

The processor(s) 110, the distance prediction system 170, and/or the autonomous driving system 160 may be operable to control the navigation and maneuvering of the vehicle 100 by controlling one or more of the vehicle systems 140 and/or components thereof. For instance, when operating in an autonomous mode, the processor(s) 110, the distance prediction system 170, and/or the autonomous driving system 160 can control the direction and/or speed of the vehicle 100. The processor(s) 110, the distance prediction system 170, and/or the autonomous driving system 160 can cause the vehicle 100 to accelerate, decelerate and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof to responsive to receiving signals or other inputs from the processor(s) 110 and/or the autonomous driving system 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the distance prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240 as implemented by the control module 220. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:

a processor;

a memory in communication with the processor and having a control module, the control module having instructions that, when executed by the processor, cause the processor to:

determine predicted distances to objects using an image acquired by a camera of a vehicle, wherein the image comprises a plurality of regions;

infer, for each individual region of the plurality of regions, a plurality of contextual features characterizing the individual region of the plurality of regions, wherein the plurality of contextual features is associated with a correction factor and includes an operating parameter of the vehicle and a weather condition, the weather condition being inferred from one or more features in the image;

correct the predicted distances for objects located in each individual region using the correction factor selected based on the plurality of contextual features characterizing the individual region, wherein the correction factor differs among the plurality of regions; and control a movement of the vehicle based on the corrected predicted distances.

2. The system of claim 1, wherein the control module further includes instructions that, when executed by the processor, cause the processor to:

responsive to determining the plurality of contextual features does not correspond to the correction factor, determine a difference between one of the predicted distances and an actual distance to at least one object; and determine a new correction factor associated with the plurality of contextual features based, at least in part, on the difference, wherein the new correction factor replaces the correction factor.

3. The system of claim 2, wherein the control module further includes instructions that, when executed by the processor, cause the processor to determine the new correction factor further include instructions that, when executed by the processor, cause the processor to determine the new correction factor responsive to determining the difference satisfies a distance threshold that is based, at least in part, on a minimal difference between the one of the predicted distances and the actual distance.

4. The system of claim 1, wherein the control module further includes instructions that, when executed by the processor, cause the processor to determine the plurality of contextual features is associated with the correction factor further include instructions that, when executed by the processor, cause the processor to train a machine learning model to correlate the plurality of contextual features with the correction factor.

5. The system of claim 1, wherein the control module further includes instructions that, when executed by the processor, cause the processor to present the corrected predicted distances to a driver of the vehicle.

6. The system of claim 1, wherein the correction factor is at least one of: an overestimation factor or an underestimation factor, wherein the overestimation factor is associated with the predicted distances being greater than an actual distance to at least one object, and wherein the underestimation factor is associated with the predicted distances being less than an actual distance to the at least one object.

7. A non-transitory computer-readable medium including instructions that, when executed by a processor, cause the processor to:

determine predicted distances to objects using an image acquired by a camera of a vehicle, wherein the image comprises a plurality of regions;

infer, for each individual region of the plurality of regions, a plurality of contextual features characterizing the individual region of the plurality of regions, wherein the plurality of contextual features is associated with a correction factor and includes an operating parameter of the vehicle and a weather condition, the weather condition being inferred from one or more features in the image;

correct the predicted distances for objects located in each individual region using the correction factor selected based on the plurality of contextual features characterizing the individual region, wherein the correction factor differs among the plurality of regions; and control a movement of the vehicle based on the corrected predicted distances.

8. The non-transitory computer-readable medium of claim 7, further including instructions that, when executed by the processor, cause the processor to:

responsive to determining the plurality of contextual features does not correspond to the correction factor, determine a difference between one of the predicted distances and an actual distance to at least one object; and determine a new correction factor associated with the plurality of contextual features based, at least in part, on the difference, wherein the new correction factor replaces the correction factor.

9. The non-transitory computer-readable medium of claim 8, wherein the instructions to determine the new correction factor further include instructions that, when executed by the processor, cause the processor to determine the new correction factor responsive to determining the difference satisfies a distance threshold that is based, at least in part, on a minimal difference between the one of the predicted distances and the actual distance.

10. The non-transitory computer-readable medium of claim 7, further including instructions that, when executed by the processor, cause the processor to determine the plurality of contextual features is associated with the correction factor further include instructions that, when executed by the processor, cause the processor to train a machine learning model to correlate the plurality of contextual features with the correction factor.

11. A method, comprising:

determining predicted distances to objects using an image acquired by a camera of a vehicle, wherein the image comprises a plurality of regions;

inferring, for each individual region of the plurality of regions, a plurality of contextual features characterizing the individual region of the plurality of regions, wherein the plurality of contextual features is associated with a correction factor and includes an operating parameter of the vehicle and a weather condition, the weather condition being inferred from one or more features in the image;

correcting the predicted distances for objects located in each individual region using the correction factor selected based on the plurality of contextual features characterizing the individual region, wherein the correction factor differs among the plurality of regions; and controlling a movement of the vehicle based on the corrected predicted distances.

12. The method of claim 11, further comprising:

in response to determining the plurality of contextual features does not correspond to the correction factor, determining a difference between one of the predicted distances and an actual distance to at least one object; and determining a new correction factor associated with the plurality of contextual features based, at least in part, on the difference, wherein the new correction factor replaces the correction factor.

13. The method of claim 12, wherein determining the new correction factor includes determining the new correction factor in response to determining the difference satisfies a distance threshold that is based, at least in part, on a minimal difference between the one of the predicted distances and the actual distance.

14. The method of claim 11, wherein determining the plurality of contextual features is associated with the correction factor includes training a machine learning model to correlate the plurality of contextual features with the correction factor.

15. The method of claim 11, further comprising presenting the corrected predicted distances to a driver of the vehicle.

16. The method of claim 11, wherein the plurality of contextual features further includes a behavior of a driver of the vehicle.

17. The method of claim 11, wherein the operating parameter of the vehicle indicates whether the vehicle is reversing.

18. The method of claim 11, wherein the weather condition includes one of precipitation, snow on a ground, or a wet ground in a vicinity of the vehicle.

* * * * *